Nov. 21, 1939.  E. R. HART  2,180,412
CLUTCH
Filed Feb. 5, 1937
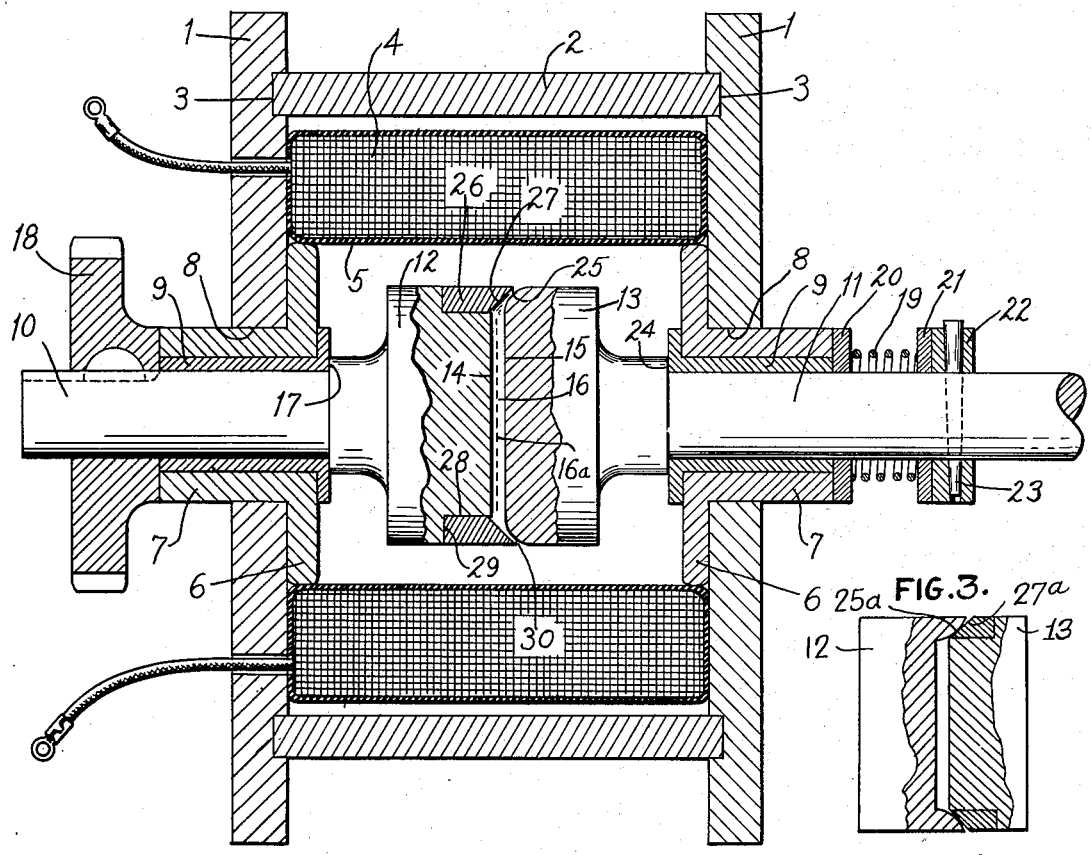
FIG.1.
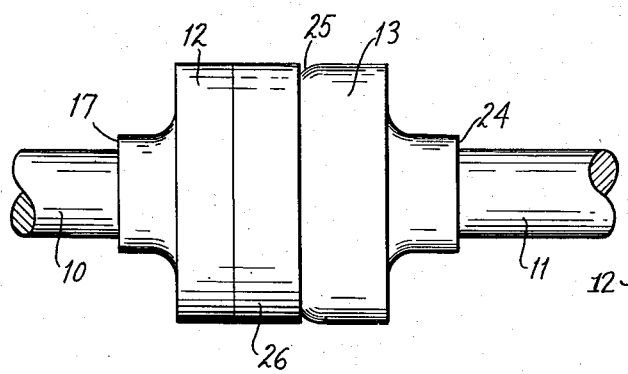
FIG.2.
FIG.3.
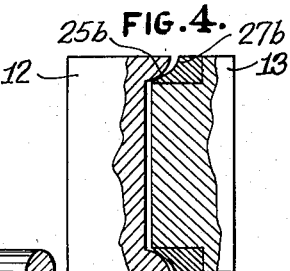
FIG.4.
FIG.5.
INVENTOR.
EARL R. HART.
BY Slough and Canfield
ATTORNEY.

Patented Nov. 21, 1939

2,180,412

UNITED STATES PATENT OFFICE 2,180,412

CLUTCH

Earl R. Hart, Cleveland Heights, Ohio, assignor to The Clark Controller Company, Cleveland, Ohio, a corporation of Ohio Application February 5, 1937, Serial No. 124,285

3 Claims. (Cl. 192—84)

This invention relates to clutches and particularly to electro-magnetic clutches for clutching together a pair of rotatable elements.

It is among the objects of the invention:

To provide generally an improved electro-magnetic clutch.

To provide an electro-magnetic clutch having improved means for preventing sticking of the engaged clutch elements by residual magnetism.

To provide an improved construction of mutually engageable clutch elements, permitting driving of one clutch element by the other when they are rotatably mounted on axes that are not in alignment.

To provide an electro-magnetic clutch having the minimum number of parts and in which adhesion of the magnetically attracted parts due to residual magnetism is prevented, and frictional engagement of the clutch elements is effected and relative universal joint movement of the engaged clutch elements is provided.

Other objects will be apparent to those skilled in the art to which my invention appertains.

My invention is fully disclosed in the following description taken in connection with the accompanying drawing in which:

Fig. 1 is a longitudinal sectional view illustrating an embodiment of the clutch of my invention associated with an electro-magnetic winding for engaging the clutch and a housing for the parts thereof;

Fig. 2 is a longitudinal elevational view of the clutch elements proper of Fig. 1.

Figs. 3, 4 and 5 are fragmentary views illustrating modifications of some of the parts of Figs. 1 and 2.

Referring to the drawing I have shown at 1—1 a pair of frame members spaced apart and connected by a tubular frame member 2, the opposite axial ends of which are seated in annular recesses 3—3 in the frame members 1—1. To secure the parts 1—1 and 2 together, the frame members 1—1 may be clamped upon the tubular member 2 by means not shown or may be otherwise secured thereto but preferably one or both of the frame members 1—1 may be removed from the end of the tubular member 2 to give access to the interior of the member 2. An electro-magnetic winding 4 having a relatively large central cylindrical opening 5, is placed within the housing substantially fitting between the two end frame members 1—1 and is supported co-axially of the tubular member 2 by retainers 6—6 preferably of circular disc form substantially fitting at their peripheries within the cylindrical opening 5 of the winding. The retainers 6 may be supported on the frame members 1—1 by any suitable means but I prefer to form them as flanges integral with tubes 7—7, the latter being projected through suitable bores 8—8 in the frame members 1—1.

The tubes 7—7 have, telescoped into the bores thereof, sleeve-type bearings 9—9 disposed in coaxial alignment and a pair of shafts 10 and 11 are rotatably supported in the bearings 9—9 in substantially co-axial alignment.

Either one of the shafts 10 and 11 may be the driving shaft and the other the driven shaft but I prefer to apply power to the shaft 10 and to transmit it and to thereby drive the shaft 11 through the clutch means proper now to be described.

On the inner ends of the shafts 10 and 11 are heads 12 and 13 respectively preferably of larger diameter than the shafts and preferably formed integrally therewith. The heads 12 and 13 and preferably therefore also the shafts 10 and 11 are formed from ferrous material.

The heads 12 and 13 are provided respectively with faces 14 and 15 preferably in planes at right angles to the rotational axis of the shafts and in the medial plane of the winding 4.

As will now be apparent, when the winding 4 is electrically energized magnetic flux will be created in the magnetic circuit comprising the two heads 12 and 13, the air gap 16 between the faces 14 and 15, the two shafts 10 and 11, the frame elements 1—1 and the tubular frame member 2; and the flux in the gap 16 will attract the heads 12 and 13 toward each other. The shaft 10 is preferably anchored against longitudinal movement by a shoulder 17 on the shaft engaging the inner end of the corresponding sleeve bearing 9 and by a gear 18 (or other mechanism element or power supplying element) on the shaft 10 engaging the outer end of the bearing 9.

The head 13 and shaft 11 however are axially movable in the direction to reduce the thickness of the air-gap 16. The shaft 11 is normally retained toward the right, as viewed in the drawing to provide the maximum air-gap 16 by a spring 19 abutting at one end upon a thrust washer 20 encircling the shaft and engaging the outer end of the corresponding bearing 9 and abutting at its other end upon a thrust washer 21 engaging a collar 22 secured to the shaft 11 in any suitable manner, for example by a pin 23. The outward movement of the shaft 11 is determined by a shoulder 24 on the shaft engaging the inner end of the corresponding bearing 9.

The spring 19 is preferably so proportioned that it will be compressed when the shaft 11 is moved inwardly or toward the left as viewed in the drawing and so that when the shaft 11 is moved toward the right by expansion of the spring, the spring will have expanded to its full length and will therefore be without tension when the shoulder 24 is approximately in engagement with the end of the bearing 9 so that in this normal position of the parts there will be substantially no pressure at the shoulder 24 nor at the thrust washers 20 and 21.

The head 13 is provided, on the axially inner portion thereof with an annular convex rounded surface 25. The head 12 has mounted thereon a sleeve 26 of non-ferrous or non-magnetic material formed with a concave conical surface 27 confronting the surface 25 and normally spaced therefrom. The surfaces 27 and 25 are both preferably co-axial of the shafts 10 and 11.

The sleeve 26 may be secured upon the head 12 in any suitable manner but preferably is telescoped on a reduced diameter portion 28 and abuts upon a shoulder 29 thereof to position it and the fit of the sleeve on the reduced diameter portion 28 is preferably a press-fit so that the sleeve will not rotate relative to the head.

The space or gap 30 between the annular surfaces 25 and 27 is smaller axially than the magnetic air-gap 16.

In the operation of the device above described, the shaft 10 may be rotated, for example by means of the gear 18 and the shaft 11 will be at rest. To drive the shaft 11, the winding 4 is energized. Thereupon the magnetic attraction effected by the flux in the air-gap 16 in the magnetic circuit above described will draw the head 13 toward the head 12 compressing the spring 19. The surface 25 will engage with the surface 27 before the faces 14 and 15 meet thus maintaining a reduced airgap 16A. The force of the attraction will frictionally engage the surfaces 25 and 27 and the shaft 11 will thereby be driven.

Although the parts above described may be constructed with the intention of causing the shafts 10 and 11 to be in axial alignment, exact axial alignment is difficult and expensive to attain; and in all clutches of this general class, and even when manufactured by approved methods, the shafts will in many cases not be in exact alignment and consequently the surfaces 14 and 15 of the construction herein described may in many cases not be parallel.

I have found by experience that if a pair of heads such as the heads 12 and 13 actually engage upon magnetic surfaces, in a plane at right angles to the axis of rotation, even a very slight degree of mis-alignment of the shafts, causing such faces to engage at a point on one side of the axis, will cause the magnetic attraction to tend to bend the shafts in their bearings and to cause them to bind therein, creating excess friction and wear. With the arrangement illustrated and above described however, providing the concave conical surface 27 and the convex rounded surface 25, and maintaining, at all times, an air-gap 16A, these defects of clutches of this general class are completely obviated. If the shafts are out of alignment the surfaces 25 and 27 will make contact with each other on at least a point and one head will roll on and drive the other somewhat in the nature of engaged gears, and both shafts will rotate freely in their bearings. The rolling contact engagement of these surfaces will be maintained by the magnetic pull, and the drive of one by the other will be made certain at varying amounts of axial mis-alignment by the wedging character of the engagement of the surfaces due to the inclined conical surface on one head and the rounded convex surface on the other head.

From the foregoing, it will now be apparent that the element 26 performs three distinct functions. It provides one of the two surfaces 27 and 25 which are frictionally pressure engaged by the magnetic attraction to effect a clutching of the two heads 12 and 13 together; and it provides one of the surfaces through which when the two heads 12 and 13 are so engaged, one may drive the other without binding in the bearings; and it also provides a non-magnetic gap to prevent actual contact engagement of the magnetic parts of the heads 12 and 13 which, because of the principle of residual magnetism, would cause these parts to stick together when the winding is de-energized.

Upon de-energizing the winding 4, the spring 19 withdraws the head 13 thus breaking the clutching engagement of the heads and transmission of power to the shaft 11 ceases. Since the gap 16A is maintained and residual magnetism cannot cause sticking, the spring 19 may be a relatively weak spring and therefore during such time as the heads are clutched together and the spring 19 is under compression, it causes small pressure at the thrust washers 20 and 21 and relatively little friction, small wear and loss of power thereat.

As stated above, the spring 19 is preferably so proportioned that when it has retracted the shaft 11 to its normal clutch-disengaged position, it will have substantially no tension therein. By this means, the ampere turns excitation of the winding 4 is reduced to the minimum because, as is well known, when an air gap, such as the air gap 16, is of substantial length, which in this instance is the case, when the heads 12 and 13 have been retracted, the magnetic pull is very much weaker than when the gap has been shortened by movement of the head 13 toward the head 12. The winding 4 must supply sufficient flux and pull to start the head 13 to move, and if the spring 19 is without tension at this time, a relatively small excitation of the winding will be sufficient to start the head 13. After the head 13 starts to move and the gap 16 reduces in length, the rapidly increasing magnetic pull can overcome the increasing tension of the spring 19. The result is that the head 13 can be moved into engagement with the head 12 with a smaller excitation in the winding 4 if the spring is without tension at the start of the pull.

Furthermore, as stated above, if desired the shaft 11 may be the driving shaft and the shaft 10 the driven shaft, and in such cases, the shaft 11 will rotate idly during periods of time when the clutch is not engaged and if, in such cases, the spring 19 were under tension there would be constant wear at the thrust washers 20 and 21, but by providing the spring 19 without tension when the head 13 is in its retracted position, such continuous wear is avoided.

The arrangement of the surfaces 27 and 25 illustrated is the preferred arrangement. However, it is believed to be apparent, that the conical surface may be on the head 13 and the rounded surface on the head 12 as shown for the rounded surface 25a and the conical surface 27a, in Fig. 3, or that the surface on the head 12 may be the magnetic surface and the surface on the head 13 the non-magnetic surface as shown for the surfaces 25a and 27a respectively, in Fig. 3, and as also shown for the surfaces 25b and 27b, of Fig. 4. Similarly, while I have shown in Figs. 1 and 2, one surface conical and the other a rounded annular surface, it will be apparent that both surfaces may be conical at slightly different angles as shown for the surfaces 25c and 27c of Fig. 5 or that both may be rounded, one concave and the other convex. In general, therefore, it may be said that the principles of the invention may be practiced with surfaces 27 and 25 which are generally frusto-conical, one concave and the other convex, and nested one within the other; and this term, frusto-conical, in the claims is used in this broad sense to be inclusive of all such arrangements.

In Figs. 3, 4 and 5, the heads 12 and 13 are illustrated in their clutch-engaged positions.

It will be apparent therefore that my invention is not limited to the exact details of construction illustrated and described and that numerous changes and modifications may be made within the spirit of my invention and without sacrificing its advantages and within the scope of the appended claims.

I claim:

1. In a magnetic clutch, a pair of rotatably supported ferrous clutch elements, having confronting surfaces providing a magnetic air-gap therebetween, an electro-magnetic winding disposed to cause, when energized, magnetic flux to flow through the air-gap to exert mutual magnetic attraction of the clutch elements, an element of non-ferrous material secured to one clutch element and having an annular substantially frusto-conical friction surface thereon, a corresponding annular convexly rounded friction surface on the other clutch element, the magnetic attraction causing the said surfaces to frictionally engage to effect a driving connection between the clutch elements, and the non-ferrous element maintaining the said air-gap to reduce residual magnetism when the winding is de-energized.

2. In a magnetic clutch, a pair of rotatably supported ferrous clutch elements, having confronting surfaces providing a magnetic air-gap therebetween, an electro-magnetic winding disposed to cause, when energized, magnetic flux to flow through the air-gap to exert mutual magnetic attraction of the clutch elements, an element of non-ferrous material secured to one clutch element and having an annular substantially frusto-conical friction surface thereon, a corresponding annular substantially frusto-conical friction surface on the other clutch element, one of said frusto-conical surfaces being concave and the other being convex the magnetic attraction causing the said surfaces to frictionally engage to effect a driving connection between the clutch elements, and the non-ferrous element maintaining the said air-gap to reduce residual magnetism when the winding is de-energized.

3. In a magnetic clutch, a main frame, a pair of rotatably supported ferrous clutch elements on the frame, one of which is axially movable, the elements having confronting surfaces providing a magnetic air-gap therebetween, an electro-magnetic winding disposed to cause, when energized, magnetic flux to flow through the air-gap to exert mutual attraction of the clutch elements, an element of non-ferrous material secured to one clutch element and having an annular substantially frusto-conical friction surface thereon, a corresponding annular substantially frusto-conical friction surface on the other clutch element, one of said frusto-conical surfaces being concave and the other being convex, the magnetic attraction causing said axially movable element to move to cause the said surfaces to frictionally engage to effect a driving connection between the clutch elements, the non-ferrous element maintaining the said air-gap to reduce residual magnetism when the winding is de-energized, a spring effecting axial thrust upon the frame and said axially movable element to effect retraction of the axially movable element and dis-engagement of the clutch elements when the winding is de-energized, and the spring being proportioned to be substantially without tension when the said element is retracted to avoid thrust effected wear during rotation of the axially movable element in its retracted position.

EARL R. HART.